C. W. LAMB.
Portable Feed Rack.
No. 53,634.
Patented April 3, 1866.
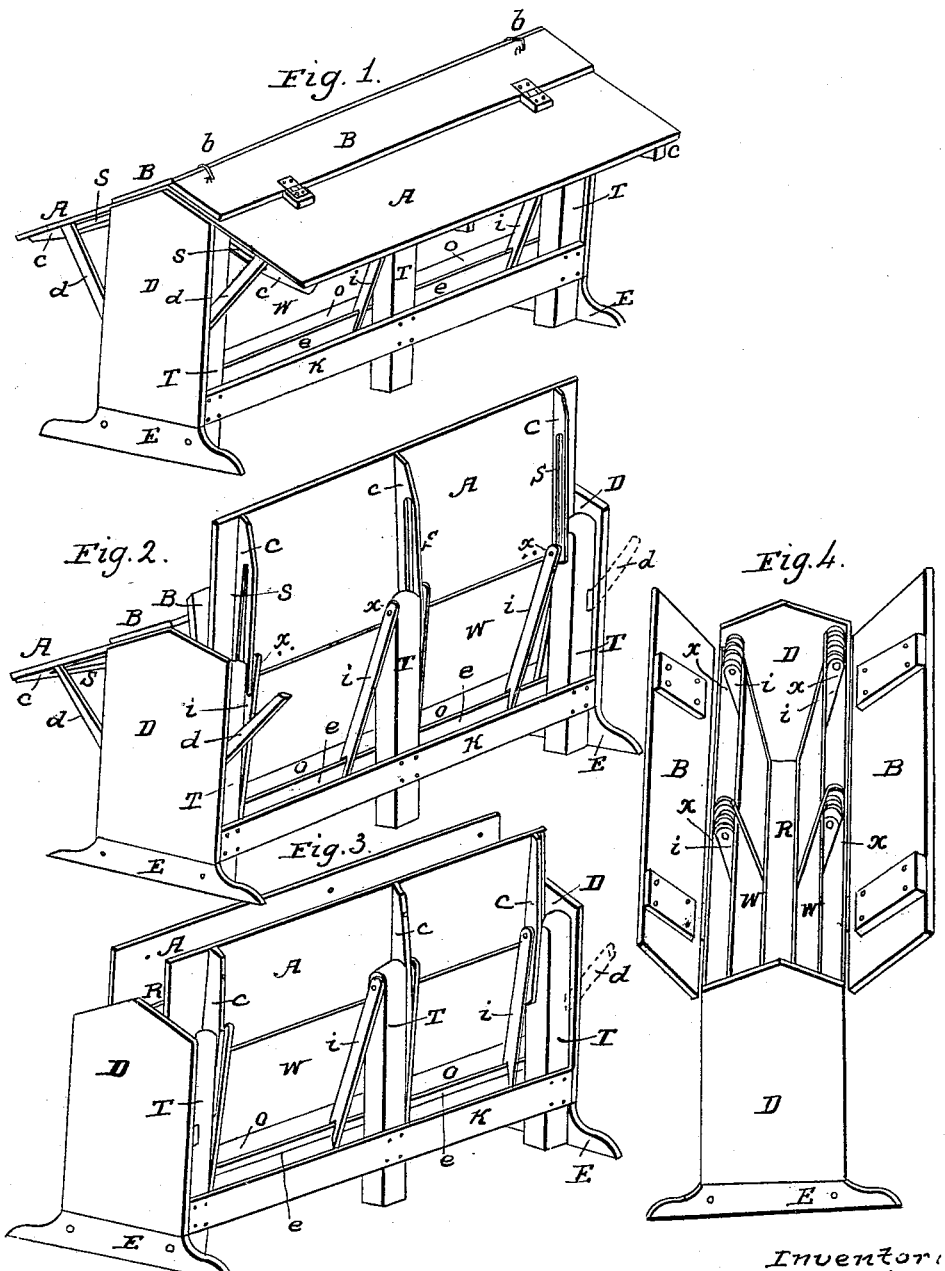

UNITED STATES PATENT OFFICE.

CASPER W. LAMB, OF COLUMBIA CITY, INDIANA.

IMPROVEMENT IN PORTABLE FEED-RACKS.

Specification forming part of Letters Patent No. 53,634, dated April 3, 1866.

*To all whom it may concern:*

Be it known that I, CASPER W. LAMB, of Columbia City, in the county of Whitley and State of Indiana, have invented a new and Improved Farm-Stock Portable Feed Rack and Shed; and I do hereby declare that the following is a full and exact description thereof, reference being had to the accompanying drawings, and the letters of reference marked thereon.

The nature of my invention consists in constructing a combined feed rack and shed for farm-stock in such a manner that the same can be economically, conveniently, and efficiently used by the farmer or stock-raiser for holding and securing fodder, hay, corn, and other stock-feed within reach of horses, cattle, sheep, hogs, and other domestic animals, and at the same time preserve the feed from being wasted by the stock or injured by exposure to inclement or stormy weather, and also protect the stock from like exposure.

My feed rack and shed is also constructed in such a manner that it can be easily moved from point to point, opened and closed with much ease and rapidity, the roof let down to exclude the stock when filling the rack with feed, and the two sides of the roof can be easily raised and brought to a level in such a manner as to form two platforms on which to place sheep for shearing.

To enable others skilled in the art to make and use my invention, I will proceed to describe its construction and operation.

I usually construct my farm-stock portable feed rack and shed of any desired size and proportions that may be suitable for the kind and number of animals to be fed, and with lumber of any desired thickness, quality, or strength, the different parts of the structure of the invention being nailed, screwed, pinned, dovetailed, or otherwise fastened together, as may be most convenient or desirable.

I generally construct my farm-stock portable feed rack and shed in the double form herein described and shown—that is, with a trough and roof arranged on each side of the rack for feeding and protecting the animals; but it may be made for feeding only from one side, if so desired, and yet secure the advantages of the combination of feed rack and shed herein described and shown.

In the accompanying drawings, illustrating my invention, like letters refer to like parts in each figure.

Figure 1 represents a full-length and end view of my feed rack and shed with the roof closed on both sides in the proper position for feeding and protecting the stock.

A A represent the roof, onto which, at $a\,a$, are hinged the caps B B, which, when closed as shown, form a part of the roof, and are fastened together at the top by the hooks, as shown at $b\,b$. D D show the ends of the feed rack and shed, and E E the base-pieces on which it rests.

T T T are upright posts, which, in connection with the rack-braces $i\,i\,i$, support the sides of the rack W. O O represent the spaces between the bottom R, Fig. 4, of the feed-rack and the lower edges of its sides W, through which spaces O O the feed is drawn by the farm-stock when feeding.

$e\,e$ represent the troughs, which are placed below the open spaces and catch the feed that falls from the spaces, as well as answer for feeding-troughs, thus performing the double office of feed-troughs and savers of feed drawn through the spaces by the animals while feeding. K is the outside portion of the troughs, which, being attached to the upright posts T T T, also assists in binding together and strenthening the whole structure.

$d\,d$ are props for supporting the roof, they having mortises (shown more plainly in Fig. 3) cut for their lower ends in the upright posts T T T, in which they (the props) fit loosely enough to admit of their being easily taken out when necessary. $c\,c\,c$ represent the roof-braces or rafters.

Fig. 2 represents the same as Fig. 1, except that the part of the roof A next to the spectator is turned up in such a manner as to show the devices by which the roof can be changed from one position to another, and also exhibits more plainly the sides of the feed-rack W and other parts of the invention.

The roof-braces $c\,c\,c$ are each slotted longitudinally, as shown at S S S, and through these slots extend the bolts $x\,x\,x$, which also bolt together the upper ends of the posts T T T and the rack-braces $i\,i\,i$. The cap B being hinged to the roof A, as represented, the roof-braces $c\,c\,c$ being firmly attached to the roof A, those braces $c\,c\,c$ being slotted longitudinally, as shown, and the bolts $x\,x\,x$ passing through the slots S S S as shown, it follows that when the hooks b b, Fig. 1, are unfastened the roof can be raised or lowered or moved forward or backward, and be placed in a great many different positions.

Fig. 3 represents my feed rack and shed when the roof from both sides is turned down into the rack, the props d d removed, the structure thus occupying but little space, and being in convenient shape to be removed from one point to another for feeding animals in different localities, as may be desired.

Fig. 4 represents an end and top view of my feed rack and shed, showing the roof closed down on both sides, thus shutting the feed-troughs from all interference by animals while the rack (R is the bottom, D D the ends, and W W the sides) is being filled with feed. The caps B B being raised, as shown, materially aid in filling the rack. It will be readily observed that the roof can be brought to a level position, and being there supported by a piece of timber or other means, will form an excellent platform for sheep-shearing and other purposes.

I do not confine myself to any particular size or proportions in the construction of my farm-stock portable feed rack and shed; neither do I claim the broad idea of making a stock feed rack and shed combined; but

What I claim as my invention, and desire to secure by Letters Patent, is—

The combination and arrangement of the different parts of my farm-stock portable feed rack and shed, substantially as described and illustrated.

CASPER W. LAMB.

Witnesses:
O. H. WOODWORTH,
S. H. WUNDERLICH.